United States Patent
Hood, III et al.

[11] Patent Number: 6,125,035
[45] Date of Patent: Sep. 26, 2000

[54] HEAT SINK ASSEMBLY WITH ROTATING HEAT PIPE

[75] Inventors: Charles D. Hood, III, Cedar Park; Peter Liu, Austin, both of Tex.

[73] Assignee: Dell USA, L.P., Round Rock, Tex.

[21] Appl. No.: 09/170,510

[22] Filed: Oct. 13, 1998

[51] Int. Cl.[7] .................................. G06F 1/20; H05K 7/20
[52] U.S. Cl. ...................... 361/687; 361/700; 165/104.33
[58] Field of Search ...................... 361/687, 699, 361/700; 174/15.2; 165/86, 104.33

[56] References Cited

U.S. PATENT DOCUMENTS

| | | |
|---|---|---|
| 4,675,783 | 6/1987 | Murase et al. . |
| 5,568,360 | 10/1996 | Penniman et al. . |
| 5,598,320 | 1/1997 | Toedtman et al. . |
| 5,712,762 | 1/1998 | Webb ....................................... 361/687 |
| 5,764,482 | 6/1998 | Meyer, IV et al. . |
| 5,784,256 | 7/1998 | Nakamura et al. ...................... 361/699 |
| 5,822,187 | 10/1998 | Garner et al. ........................... 361/687 |
| 5,826,645 | 10/1998 | Meyer, IV et al. ................. 165/104.33 |
| 5,910,883 | 6/1999 | Cipolla et al. ........................... 361/687 |
| 5,966,286 | 10/1999 | O'Conner et al. ...................... 361/699 |

*Primary Examiner*—Lynn D. Feild
*Attorney, Agent, or Firm*—Haynes and Boone, LLP

[57] ABSTRACT

A portable computer includes a chassis having a heat producing electronic component mounted therein. A heat sink is mounted in the chassis adjacent the component. A heat pipe has a first end rotatably connected to the heat sink and extends to a second end engaged with the component. The heat pipe is rotatable so as to move the second end into and out of engagement with the component.

30 Claims, 4 Drawing Sheets

HEAT SINK ASSEMBLY WITH ROTATING HEAT PIPE

This application relates to co-pending U.S. patent application Ser. No. 09/088,814, filed on Jun. 2, 1998, entitled INTEGRATED HYBRID COOLING WITH EMI SHIELDING FOR A PORTABLE COMPUTER, naming Mark B. Penniman, Russell C. Smith and Todd Steigerwald as inventors. The co-pending application is incorporated herein by reference in its entirety, and is assigned to the assignee of this invention.

BACKGROUND

The disclosures herein relate generally to heat dissipation and more particularly to a system for providing heat dissipation for integrated circuits in a portable computer system.

A portable computer is a self-contained personal computer which can be easily moved to and operated at various locations. Portable computers are often referred to as laptop or notebook computers. To be portable, these computers must be small, compact, and lightweight. The conventional portable computer includes a base portion and a lid portion that pivotally opens from the base portion when the portable computer is in use. The lid portion contains a flat panel display such as a liquid crystal display (LCD) or other suitable display.

Heat distribution is a problem with some computers, especially with portable computers. In the past, portable computers have used thermal transfer mechanisms such as heat spreaders, heat sinks, heat pipes, and fans to address this problem. One type of heat spreader is a metal piece that is thermally coupled to a processor and distributes heat away from the processor. Typically, a heat spreader is made of relatively pure aluminum for good thermal conductivity and for reduced weight. However, aluminum oxide coatings typically form on the outside of items made of aluminum which reduces their ability to provide low impedance electrical connections with other items in contact with the aluminum material. Because heat spreaders typically serve only one function, they add extra pieces to the computer system assembly as well as increasing the complexity of the build and repair operations.

Fans and heat sinks provide cost effective mechanisms for thermally managing many types of portable computer systems. Fans, however, require power and heat sinks require space. While power and space are generally in abundant supply in desktop-type minicomputers, portable computers have only a limited supply of both power and space. A commercial advantage is achieved by manufacturing portable computers that are both small and lightweight. Further, portable computers must operate with power conservation in mind. An operable fan may unduly draw upon the batteries of a laptop making it unattractive for long periods of battery-operated use.

Heat pipes are self contained, phase transformation, heat carrying devices, i.e. a superconductor of heat. A typical heat pipe may comprise a closed copper tube having a partial vacuum internally. Water in a hot portion of the tube boils at a lower than usual temperature in the partial vacuum. The boiling water seeks a cooler spot and thus steam moves to carry heat to the cooler spot where the steam condenses to cooler water which returns to the hot spot. The cycle is ongoing which provides a contained circulating system.

U.S. Pat. No. 4,675,783 discloses a heat pipe-heat sink for air cooling of semiconductor devices characterized by arranging heat pipes in a zig-zag form toward the direction of air flow around the fin section in the heat sinks. A block for mounting the semiconductor device is fitted to the heat-in sections of the plural heat pipes arranged in parallel, and a large number of radiating fins crossing over the heat pipes are fitted to the heat-out sections of the heat pipes protruding from the block.

U.S. Pat. No. 5,568,360 discloses a heat transfer system provided for dissipating thermal energy within a personal computer. The transfer system is designed to move heat from a heat source, such as a central processing unit (CPU), to a heat sink arranged upon the portable computer keyboard. The heat transfer mechanism includes a heat slug thermally coupled to the CPU heat source, and a heat pipe thermally coupled to a backside surface of a computer keyboard. The heat pipe is designed having minimal thermal gradient, and includes an evaporation/condensation cycle associated with its operation. The heat pipe is preferably orthogonally shaped having at least one flat surface arranged near the intersection of the orthogonal members. The flat section is in registry with a heat source. Movement of the flat section relative to the heat source effectuates abutment and thermal contact therebetween. This thermal energy transfer system is designed for enhanced heat transfer within a portable computer system without undergoing the disadvantages of bulky finned heat sinks and/or fans.

U.S. Pat. No. 5,598,320 discloses a rotatable and slidable heat pipe apparatus for transferring heat away from a microprocessor chip more rapidly than by heat sink surface area dissipation to the surrounding air alone, comprising a heat sink with an integral cylindrical passageway adapted to receive a first end of a heat pipe shaped like a crankshaft, and a heat spreader formed from a metal plate with a first end rolled up to define a cylindrical opening adapted to receive a second end of the heat pipe. The heat spreader is attached to an underside of a keyboard. Since the heat pipe is able to rotate within the cylindrical passageway and the cylindrical opening, the keyboard can be raised to an open position and lowered to a closed position quickly and simply without the risk of breaking or bending the heat pipe, and manufacturing position tolerances between the heat pipe apparatus components are increased resulting in a simplified manufacturing process. The heat pipe can also be slid in to and out of the cylindrical passageway or the cylindrical opening, thereby enabling computer manufacturers to incorporate the heat pipe into portable battery powered notebook-type computer systems designed to allow a user to remove, replace, or swap internal components by simply flipping open or removing the keyboard, and further enabling a user to perform maintenance work or repairs on the computer system without concern for damage to the heat pipe.

U.S. Pat. No. 5,764,482 discloses a heat sink for an integrated circuit chip which uses heat pipe cooling to remove the heat. The heat sink is a heat conductive structure such as a bowl which is associated with the integrated circuit socket, having the heat conductive structure held against the integrated circuit. A heat pipe is attached to the structure by using an extension from the heat conductive structure and wrapping the extension around a simple cylindrical heat pipe. One embodiment uses spring clips to attach the heat sink to the socket, and another version uses attachment screws through tabs which are formed from the material around a bowl shaped heat conductive structure.

Processor modules require an efficient and effective thermal connection to insure that a proper operating temperature is maintained during use. It is desirable to install the processor late in the assembly process in order to support order requirements. Because the heat transfer assembly is installed prior to the processor module, a problem arises. The heat transfer assembly includes a heat sink coupled to a heat pipe. The heat pipe extends from the heat sink to a position of engagement with a top surface of the processor module. Due to the rigid structure of the heat pipe, the processor module cannot be installed when the heat transfer assembly is in place. Thus, the heat transfer assembly must be removed, or at least disconnected from the chassis to permit installation of the processor module.

Therefore, what is needed is a heat transfer assembly which can be installed in a portable computer chassis prior to the installation of the processor module, and which does not require removal or disconnection from the chassis to permit the processor module to be installed.

SUMMARY

One embodiment, accordingly, provides a heat pipe movably mounted in the computer chassis, such that the heat pipe is movable after installation, to permit access to other components in the chassis. To this end, a heat transfer assembly includes a heat sink having a heat pipe receiving portion therein. A heat pipe has a first end rotatably mounted in the receiving portion so that the heat pipe is rotatable relative to the heat sink.

A principal advantage of this embodiment is that the processor module can be installed and removed from the computer chassis without the need to remove or disconnect the heat transfer assembly from the chassis. The heat pipe can remain connected to a host heat sink and can be pivoted into and out of heat transfer engagement with the processor module.

DETAILED DESCRIPTION

Figure 1:
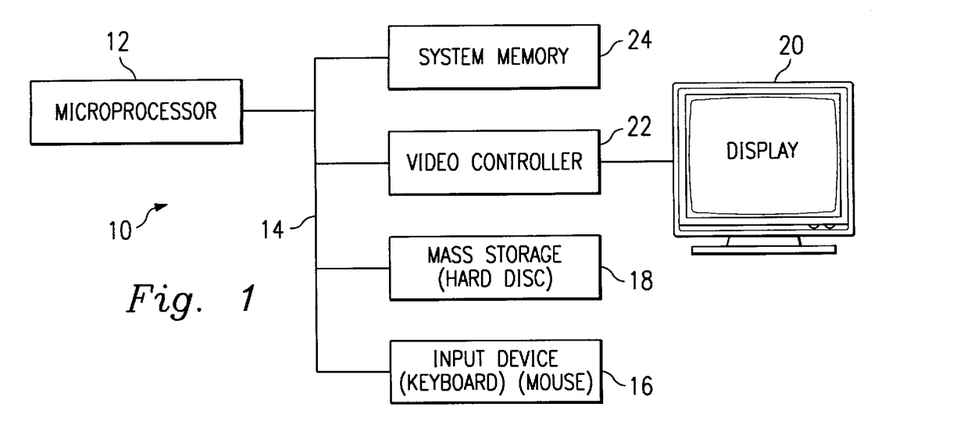
FIG. 1 is a diagrammatic view illustrating an embodiment of a computer system.

In one embodiment, computer system 10, FIG. 1 includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 10 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
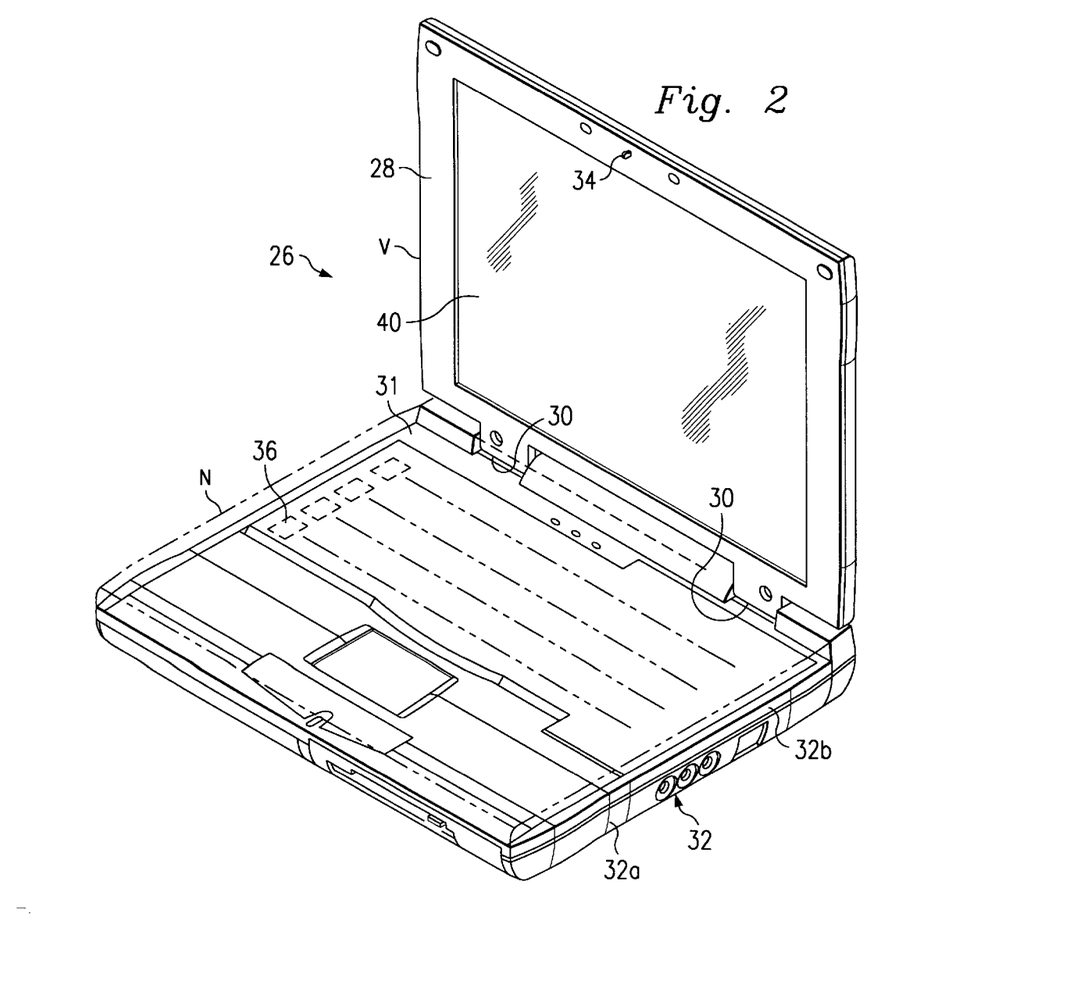
FIG. 2 is a perspective view illustrating an embodiment of a portable laptop computer.

Referring to FIG. 2, illustrated is a portable, notebook size computer designated 26 comprising a self-contained system, such as that illustrated at 10 in FIG. 1, and including a hinged top or lid 28 rotatable about a hinge or hinges 30 from a nested position "N", with a horizontal base 32, to a substantially vertical or open position "V". Opening of the notebook style portable computer by manipulation of a latch 34, reveals a plurality of keys 36 on base 32, and a monitor screen 40 mounted in lid or top 28. Base 32 includes a bottom or first member 32a and a top or second member 32b.

Figure 3:
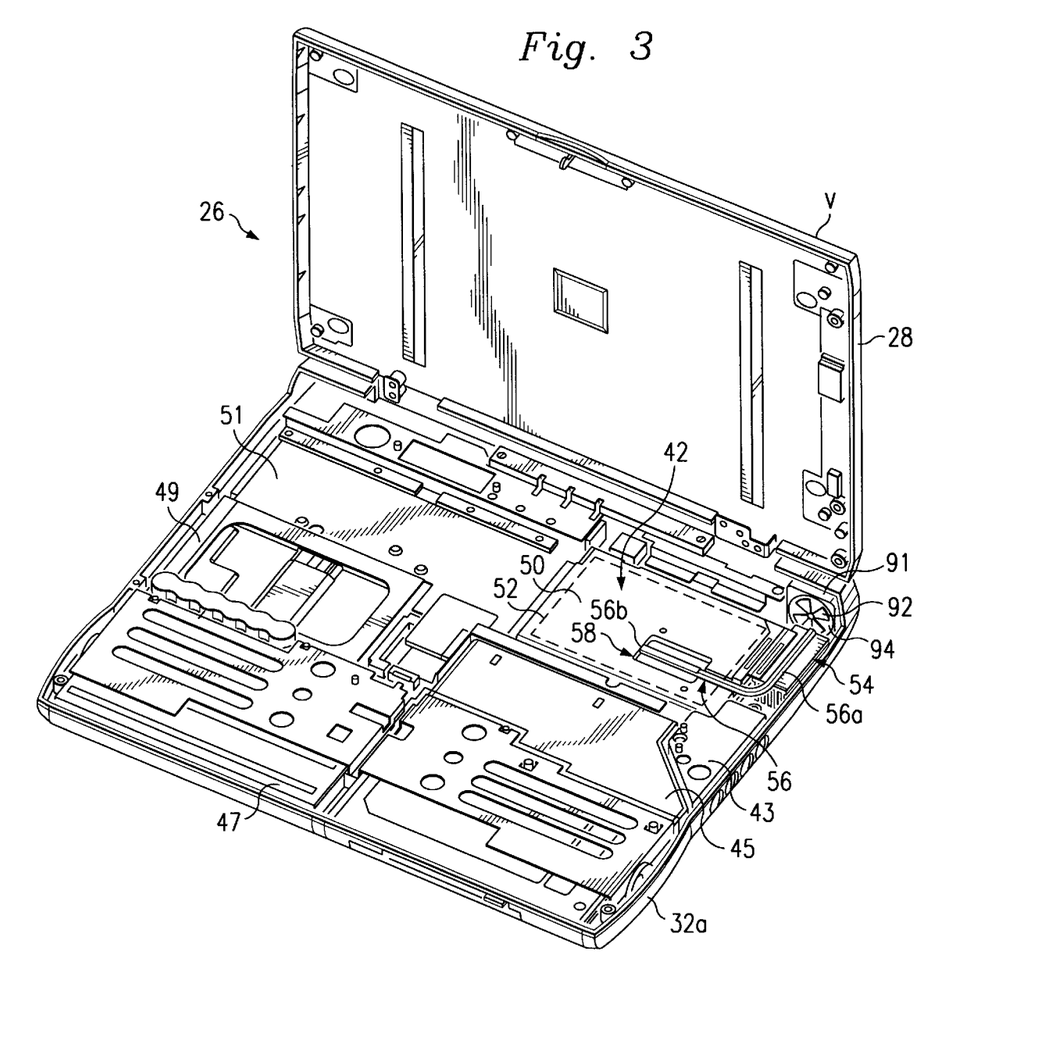
FIG. 3 is another perspective view illustrating an embodiment of a partially disassembled laptop computer.

Computer 26, FIG. 3 illustrates the first member 32a of base 32 with the second or keyboard member 32b removed thus exposing some of the components mounted in base 32. Some of the components include a hybrid cooling section 42, an audio subsection 43, a CD floppy module section 45, a battery bay section 47, a hard-disk drive section 49 and a motherboard 51. Top 28 is illustrated in the open position V and has the monitor screen 40 removed. Cooling section 42 includes a heat spreader cap 50 mounted on a processor module 52, a heat sink 54 mounted on motherboard 51, a fan housing 91 including a fan 92 mounted in a fan duct 94 in base 32, and a heat pipe 56 thermally interconnecting heat spreader cap 50 and heat sink 54. A first end 56a of heat pipe 56 is rotatably attached to heat sink 54, and a second end 56b of heat sink 56 is attached to heat spreader cap 50 by means of a thermal block 58.

Figures 4, 5:
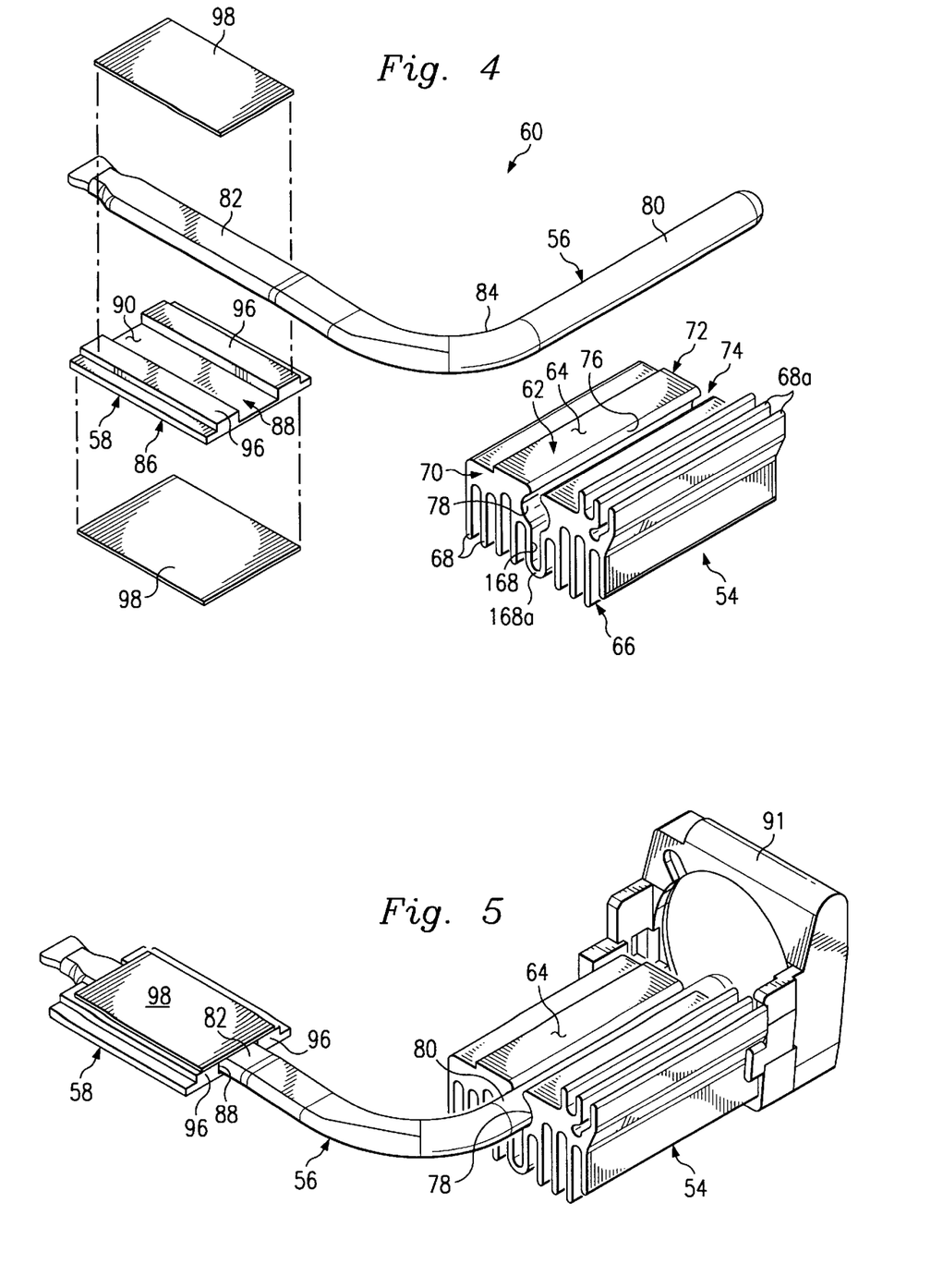
FIG. 4 is an exploded perspective view illustrating an embodiment of a heat transfer assembly.
FIG. 5 is an assembled perspective view illustrating an embodiment of the heat transfer assembly.

A heat transfer assembly 60, FIG. 4 includes a heat sink 54, heat pipe 56 and thermal block 58. Heat sink 54 is formed of extruded aluminum and is generally rectangular including a first side 62 having a planar surface 64, and a second side 66 having a plurality of fin members 68. It should be noted that additional fin members 68a, may be provided to extend from planar surface 64 if desired. Heat sink 54 also includes a first end 70 and a second end 72. An elongated keyhole-shaped groove 74 extends from first end 70 to second end 72. Groove 74 includes a portion adjacent the fin members 68. This portion is a generally U-shaped fin member 168 having a closed end 168a. Another portion of groove 74 is a slot 76 contiguously formed with, and opening into, planar surface 64. Still another portion of groove 74 is a heat pipe receiving portion in the form of an annular aperture 78 between the closed end 168a and the open slot 76.

Heat pipe 56 includes a circular portion 80, a substantially flat portion 82 and an intermediate portion 84 interconnecting the circular portion 80 with the flat portion 82. Thermal block 58 includes a planar surface 86 on one side thereof, and a groove 88 on another side thereof, opposite the planar side. Groove 88 includes a planar base 90 and a pair of parallel raised ribs 96 extending on opposite sides of groove 88.

Assembly of heat pipe 56 and heat sink 54, FIGS. 4 and 5, is accomplished by inserting circular portion 80 of heat pipe 56 in annular aperture 78, and preferably including a suitable commercially available thermal grease to form a thermal lubricant therebetween. Some flexibility between aperture 78 and heat pipe 56 is provided by slot 76. Flat portion 82 of heat pipe 56 is nested in groove 88 of the thermal block 58, between ribs 96. Flat portion 82 is dimensioned in width and height to fit within the spacing between ribs 96 and substantially match the height of the ribs 96. As such, when flat portion 82 is nested in groove 88, a substantially even surface is formed for receiving and supporting a piece of commercially available thermal film 98. Another piece of the thermal film 98 is received and supported on planar surface 86 of thermal block 58. Fan housing 91 is provided to receive end 72 of heat sink 54.

Figure 6:
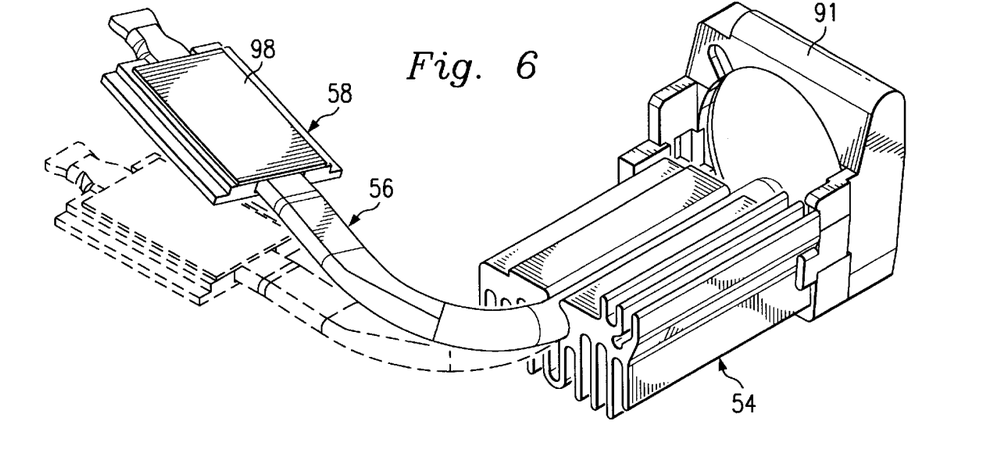
FIG. 6 is a perspective view illustrating an embodiment of a rotating heat pipe.
Figure 7:
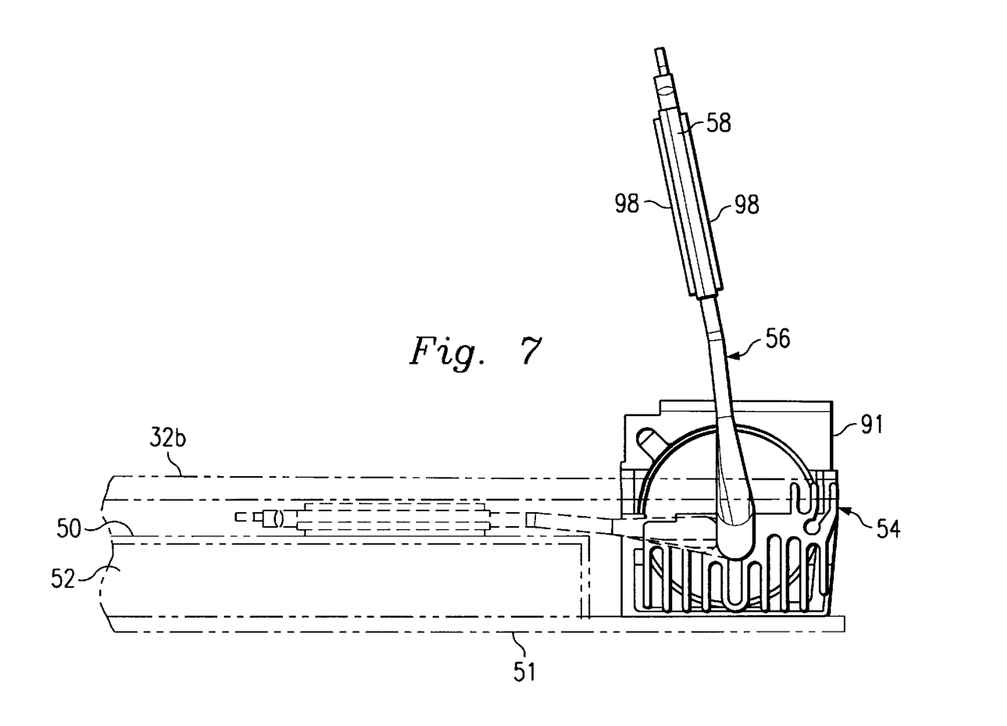
FIG. 7 is a frontal view illustrating an embodiment of the rotating heat pipe.

The insertion of circular portion 80 of heat pipe 56 in annular aperture 78, and the presence of the thermal grease therebetween, provides a rotating engagement between heat pipe 56 and the sink 54, see FIGS. 6 and 7. As such, heat pipe 56 including thermal block 58 may be rotated relative to heat sink 54. Thus, when heat sink 54 and processor module 52 are mounted on motherboard 51, heat pipe 56 is rotatable into and out of engagement with heat spreader cap 50. As such, when assembled, FIG. 7, thermal block 58, including thermal film 98, is sandwiched between heat spreader cap 50 and removable keyboard member 32*b*. Heat generated from processor module 52 is passively transferred to the spreader cap 50. Some of the heat is removed by spreader cap 50 and some of the heat is moved to heat sink 54 by heat pipe 56. Operation of fan 92 draws cooling air across heat sink 54 to actively carry heat away from the heat sink 54.

In operation, the embodiments disclosed herein utilize a thermally conductive rotating joint to allow the processor to be accessed with minimal disassembly of the system. This enables the heat sink assembly to be attached to the main board assembly in advance of final assembly without precluding installation of the processor module at final assembly. The thermally conductive rotating joint is accomplished with the keyhole shaped opening in the extruded heatsink. The round heat pipe is attached to this heat sink with a light press fit. The keyhole geometry provides some flexibility in the heat sink allowing the design to utilize a significant nominal interference thus insuring good thermal contact without requiring unrealistic dimensional tolerances. This is provided by the slot formed in one surface of the heat sink.

As a result, one embodiment provides a heat transfer assembly including a heat sink having a heat pipe receiving portion therein. The heat pipe has a first end rotatably mounted in the receiving portion so that the heat pipe is rotatable relative to the heat sink.

Another embodiment provides a portable computer having a heat producing electronic component mounted therein. A heat sink is mounted in the computer. A heat pipe has a first end rotatably mounted in the heat sink and a second end in engagement with the electronic component, whereby the heat pipe is rotatable to move the second end away from the electronic component.

Still another embodiment provides a computer system including a microprocessor, an input coupled to provide input to the microprocessor, a mass storage coupled to the microprocessor, a display coupled to the microprocessor by a video controller, and a memory coupled to provide storage to facilitate execution of computer programs by the microprocessor. A chassis includes a heat sink having a heat pipe receiving portion therein. A heat pipe has a first end rotatably mounted in the receiving portion so that the heat pipe is rotatable relative to the heat sink.

A further embodiment provides a method of mounting a heat transfer assembly in a computer chassis including mounting a heat producing electronic component in the chassis, mounting a heat sink in the chassis, and rotatably connecting a heat pipe to the heat sink so that the heat pipe can be rotated relative to the heat sink for movement into and out of engagement with the electronic component.

As it can be seen, the principal advantages of these embodiments are that a thermally conductive attachment can be made between the heat sink and the main board assembly thus enhancing the passive heat dissipation capability of the system without adding additional parts and weight. The entire thermal solution can be tested at the board assembly level prior to final assembly thus reducing opportunities for defects during the manufacturing process. Fewer parts need to be handled at final assembly. Connection of the heat pipe to the processor is self-fixtured at final assembly thus making this operation less prone to defects.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A heat transfer assembly comprising:

a heat sink having a heat pipe receiving portion therein;

a heat pipe having a first end rotatably mounted in the receiving portion so that the heat pipe is rotatable relative to the heat sink; and the heat sink having an elongated groove formed therein, the groove including a first portion forming a fin, and a second portion forming the heat pipe receiving portion.

2. The assembly as defined in claim 1 wherein the heat pipe receiving portion includes an elongated aperture extending through the heat sink.

3. The assembly as defined in claim 2 wherein the heat sink includes a planar surface having a slot formed therein.

4. The assembly as defined in claim 3 wherein the slot is contiguous with the elongated aperture.

5. A heat transfer assembly comprising:

a heat sink having a heat pipe receiving portion therein;

a heat pipe having a first end rotatably mounted in the receiving portion so that the heat pipe is rotatable relative to the heat sink; and the heat sink being an extruded member including a keyhole shaped elongated groove formed therein, the groove including a first portion forming a fin, a second portion forming the heat pipe receiving portion, and a third portion forming a slot in a surface of the heat sink.

6. A heat transfer assembly comprising:

a heat sink having a heat pipe receiving portion therein;

a heat pipe having a first end rotatably mounted in the receiving portion so that the heat pipe is rotatable relative to the heat sink; and the heat sink including a first side having a planar surface, a second side having a plurality of fins extending therefrom, and an elongated groove extending through the heat sink and having a closed portion adjacent the fins and an open portion adjacent the planar surface.

7. The assembly as defined in claim 6 wherein the groove includes the heat pipe receiving portion between the closed portion and the open portion.

8. The assembly as defined in claim 7 wherein the heat pipe includes a thermal block connected to a second end, opposite the first end.

9. A portable computer comprising:

a heat producing electronic component mounted in the computer;

a heat sink mounted in the computer;

a heat pipe having a first end rotatably mounted in a heat pipe receiving portion of the heat sink and a second end in engagement with the electronic component, whereby the heat pipe is rotatable to move the second end away from the electronic component; and the heat sink having an elongated groove formed therein, the groove including a first portion forming a fin, and a second portion forming the heat pipe receiving portion.

10. The portable computer as defined in claim 9 wherein the second end includes a thermal block connected thereto.

11. The portable computer as defined in claim 9 wherein the heat pipe is mounted in an elongated aperture formed in the heat sink.

12. The portable computer as defined in claim 11 wherein the heat sink includes a planar surface having a slot formed therein.

13. The portable computer as defined in claim 12 wherein the slot is contiguous with the elongated aperture.

14. A portable computer comprising:

a heat producing electronic component mounted in the computer;

a heat sink mounted in the computer;

a heat pipe having a first end rotatably mounted in the heat sink and a second end in engagement with the electronic component, whereby the heat pipe is rotatable to move the second end away from the electronic component; and the heat sink including an elongated groove formed therein, the groove including a first portion forming a fin, a second portion receiving the first end of the heat pipe, and a third portion forming a slot in a surface of the heat sink.

15. A portable computer comprising:

a heat producing electronic component mounted in the computer;

a heat sink mounted in the computer;

a heat pipe having a first end rotatable mounted in the heat sink and a second end in engagement with the electronic component, whereby the heat pipe is rotatable to move the second end away from the electronic component: and the heat sink including a first side having a planar surface, a second side having a plurality of fins extending therefrom, and an elongated groove extending through the heat sink and having a closed portion adjacent the fins and an open portion adjacent the planar surface.

16. The portable computer as defined in claim 15 wherein the first end of the heat pipe is inserted into the groove between the closed portion and the open portion.

17. The portable computer as defined in claim 16 wherein the heat pipe includes a thermal block connected to the second end.

18. A computer system comprising:

a microprocessor;

an input coupled to provide input to the microprocessor;

a mass storage coupled to the microprocessor;

a display coupled to the microprocessor by a video controller;

a memory coupled to provide storage to facilitate execution of computer programs by the microprocessor;

a chassis;

a heat sink mounted in the chassis, and having a heat pipe receiving portion therein;

a heat pipe having a first end rotatably mounted in the receiving portion so that the heat pipe is rotatable relative to the heat sink; and the heat sink having an elongated groove formed therein, the groove having a first portion forming a fin, and a second portion forming the heat pipe receiving portion.

19. The computer system as defined in claim 18 wherein the heat pipe receiving portion includes an elongated aperture extending through the heat sink.

20. The computer system as defined in claim 19 wherein the heat sink includes a planar surface having a slot formed therein.

21. The computer system as defined in claim 20 wherein the slot is contiguous with the elongated aperture.

22. A computer system comprising:

a microprocessor;

an input coupled to provide input to the microprocessor;

a mass storage coupled to the microprocessor;

a display coupled to the microprocessor by a video controller;

a memory coupled to provide storage to facilitate execution of computer programs by the microprocessor;

a chassis;

a heat sink mounted in the chassis, and having a heat pipe receiving portion therein;

a heat pipe having a first end rotatable mounted in the receiving portion so that the heat pipe is rotatable relative to the heat sink; and the heat sink including an elongated groove formed therein, the groove including a first portion forming a fin, a second portion forming the heat pipe receiving portion, and a third portion forming a slot in a surface of the heat sink.

23. A computer system comprising:

a microprocessor;

an input coupled to provide input to the microprocessor;

a mass storage coupled to the microprocessor;

a display coupled to the microprocessor by a video controller;

a memory coupled to provide storage to facilitate execution of computer programs by the microprocessor;

a chassis;

a heat sink mounted in the chassis, and having a heat pipe receiving portion therein;

a heat pipe having a first end rotatably mounted in the receiving portion so that the heat pipe is rotatable relative to the heat sink; and the heat sink including a first side having a planar surface, a second side having a plurality of fins extending therefrom, and an elongated groove extending through the heat sink and having a closed portion adjacent the fins and an open portion adjacent the planar surface.

24. The computer system as defined in claim 23 wherein the groove includes the heat pipe receiving portion between the closed portion and the open portion.

25. The computer system as defined in claim 24 wherein the heat pipe includes a thermal block connected to a second end, opposite the first end.

26. A method of mounting a heat transfer assembly in a computer chassis comprising the steps of:

mounting a heat producing electronic component in the chassis;

mounting a heat sink in the chassis;

rotatably connecting a heat pipe to the heat sink so that the heat pipe can be rotated relative to the heat sink for movement into and out of engagement with the electronic component; and providing an elongated groove in the heat sink, the groove including a first portion forming a fin, and a second portion forming a heat pipe receiving portion.

27. The method as defined in claim 26 further comprising the step of providing a groove in the heat sink for receiving the heat pipe.

28. The method as defined in claim 26 further comprising the step of providing a thermal block on the heat pipe for engagement with the electronic component.

29. A method of mounting a heat transfer assembly in a computer chassis comprising the steps of:

mounting a heat producing electronic component in the chassis;

mounting a heat sink in the chassis;

rotatably connecting a heat pipe to the heat sink so that the heat pipe can be rotated relative to the heat sink for movement into and out of engagement with the electronic component; and providing an elongated groove in the heat sink, the groove including a first portion forming a fin, a second portion receiving the heat pipe, and a third portion forming a slot in a surface of the heat sink.

30. A method of mounting a heat transfer assembly in a computer chassis comprising the steps of:

mounting a heat producing electronic component in the chassis;

mounting a heat sink in the chassis;

rotatable connecting a heat pipe to the heat sink so that the heat pipe can be rotated relative to the heat sink for movement into and out of engagement with the electronic component; and providing an elongated groove in the heat sink for receiving the heat pipe, the groove having a closed end adjacent a finned portion of the heat sink and having an open portion adjacent the heat pipe.

* * * * *

UNITED STATES PATENT AND TRADEMARK OFFICE
CERTIFICATE OF CORRECTION

| | |
|---|---|
| PATENT NO. | : 6,125,035 |
| DATED | : September 26, 2000 |
| INVENTOR(S) | : Charles D. Hood, III and Peter Liu |

It is certified that error appears in the above-identified patent and that said Letters Patent is hereby corrected as shown below:

Column 9,
Lines 8-10, please delete claim 27.

Column 9, line 11 to Column 10, line 20,
Please renumber claims 28-30 as appropriate.

Signed and Sealed this

Nineteenth Day of November, 2002

*Attest:*

*Attesting Officer*

JAMES E. ROGAN
*Director of the United States Patent and Trademark Office*